United States Patent
Chirls

(10) Patent No.: US 8,849,265 B2
(45) Date of Patent: Sep. 30, 2014

(54) EFFECTIVE CONTACT-COMMUNICATION SYSTEMS AND METHODS

(71) Applicant: Effectiveness Institute, Inc., Bellevue, WA (US)

(72) Inventor: Clifford Chirls, Mercer Island, WA (US)

(73) Assignee: Effectiveness Institute, Inc., Bellevue, WA (US)

( * ) Notice: Subject to any disclaimer, the term of this patent is extended or adjusted under 35 U.S.C. 154(b) by 111 days.

(21) Appl. No.: 13/715,940

(22) Filed: Dec. 14, 2012

(65) Prior Publication Data

US 2013/0157633 A1  Jun. 20, 2013

Related U.S. Application Data

(60) Provisional application No. 61/578,171, filed on Dec. 20, 2011.

(51) Int. Cl.
  *H04M 3/42* (2006.01)
  *H04W 4/00* (2009.01)
  *H04M 1/2745* (2006.01)
  *H04M 1/57* (2006.01)

(52) U.S. Cl.
  CPC ............ *H04M 3/42042* (2013.01); *H04W 4/00* (2013.01); *H04M 1/274508* (2013.01); *H04M 1/575* (2013.01); *Y10S 706/934* (2013.01)

USPC ..... 455/415; 455/418; 379/88.19; 379/93.03; 379/93.23; 707/621; 706/47; 706/45; 706/934

(58) Field of Classification Search
  USPC ................. 379/93.23, 88.19, 93.03; 455/415; 707/621; 706/47.45, 934
  See application file for complete search history.

(56) References Cited

U.S. PATENT DOCUMENTS

| | | | |
|---|---|---|---|
| 6,950,503 B2 * | 9/2005 | Schwartz et al. | 379/88.13 |
| 2005/0210065 A1 * | 9/2005 | Nigam et al. | 707/104.1 |
| 2008/0242284 A1 * | 10/2008 | Vechey et al. | 455/415 |
| 2008/0261575 A1 * | 10/2008 | Heikinheimo | 455/415 |

* cited by examiner

*Primary Examiner* — Khalid Shaheed

(74) *Attorney, Agent, or Firm* — ÆON Law; Adam L. K. Philipp

(57) ABSTRACT

A mobile personal-computing device may categorize a selected contact by collecting from the user information related to the selected contact's behavior and/or personality style. After obtaining communication hints for effectively communicating with similarly categorized individuals. The mobile personal-computing device modifies a remote or local contacts database such that when the user communicates with the selected contact, the mobile personal-computing device will automatically provide the communication hints to the user.

20 Claims, 7 Drawing Sheets

| 605A | 605B |
|---|---|
| Process:<br>• Tends to do more listening than talking; seems to allow others to initiate and carry conversations.<br>• Tends to look away often and lean back while having a conversation.<br>• Speaks in a thoughtful and slower-paced manner; seems to pause frequently while speaking.<br>• Asks questions about others' needs more often than states personal needs, expectations and opinions.<br>• Appears to avoid arguments and energetic debate. | Expedience:<br>• Tends to do more talking than listening; seems to enjoy initiating and carrying a conversation.<br>• Tends to make direct eye contact and lean forward while having a conversation.<br>• Speaks in a fast-paced manner; rarely seems to pause while speaking.<br>• States personal needs, expectations and opinions more often than asks questions about others' needs.<br>• Appears to enjoy arguments and energetic debate. |
| Controlled:<br>• Appears to limit facial expressions; does not seem to frequently smile, nod or frown.<br>• Actions seem careful or deliberate; most comfortable dealing with objective facts or detailed information.<br>• Focuses on accomplishing work; attention seems to be on involvement with tasks.<br>• Limited use of gestures; actions seem to be careful and deliberate.<br>• Shares very little of personal feelings and emotions; seems to limit personal story-telling or self-disclosing small talk. | Responsive:<br>• Appears to use facial expressions freely and easily; seems to frequently smile, nod or frown.<br>• Actions seem spontaneous and eager; most comfortable dealing with opinions and feelings.<br>• Focuses on relationships; attention seems to be on involvement with people.<br>• Gestures freely and frequently; actions seem to be spontaneous and animated.<br>• Shares personal feelings and emotions openly; seems to enjoy personal story-telling and self-disclosing small talk. |
| 610A | 610C |

*Fig. 6*

EFFECTIVE CONTACT-COMMUNICATION SYSTEMS AND METHODS

CROSS-REFERENCE TO RELATED APPLICATIONS

This application claims the benefit of priority to U.S. Provisional Patent Application No. 61/578,171; titled "SYSTEMS AND METHODS FOR AIDING COMMUNICATION WITH A CONTACT"; filed Dec. 20, 2011; and naming inventor Clifford Chirls. The above-cited application is incorporated herein by reference in its entirety, for all purposes.

FIELD

The present disclosure relates to the field of mobile computing, and more particularly, to modifying contact records in a contacts database to promote effective communication with individuals associated with the modified contact records.

BACKGROUND

Communications between two people may be promoted when one person understands the individual behavior and/or personality styles of the other. Such communications may be further enhanced when one can adapt his or her communication style to suit the natural inclinations of the other. While there are many tests and assessments for determining the different behavior and/or personality styles of specific individuals, it is often difficult for a person to remember the specific behavior and/or personality style of a given individual with whom he or she communicates. Moreover, it can be difficult for a person to remember best practices for effective communication for each of those specific behavior and/or personality styles.

Therefore, there exists a need for computer-implemented systems and methods that help a user assess and access behavior and/or personality style information for the individuals with whom he or she communicates during communication sessions, for example, during telephone calls.

BRIEF DESCRIPTION OF THE DRAWINGS

FIG. 6 illustrates a plurality of alternative statement pairs that may be combined to form a plurality of questions that solicit information related to an individual's behavior and/or personality style.

DESCRIPTION

Figure 1:
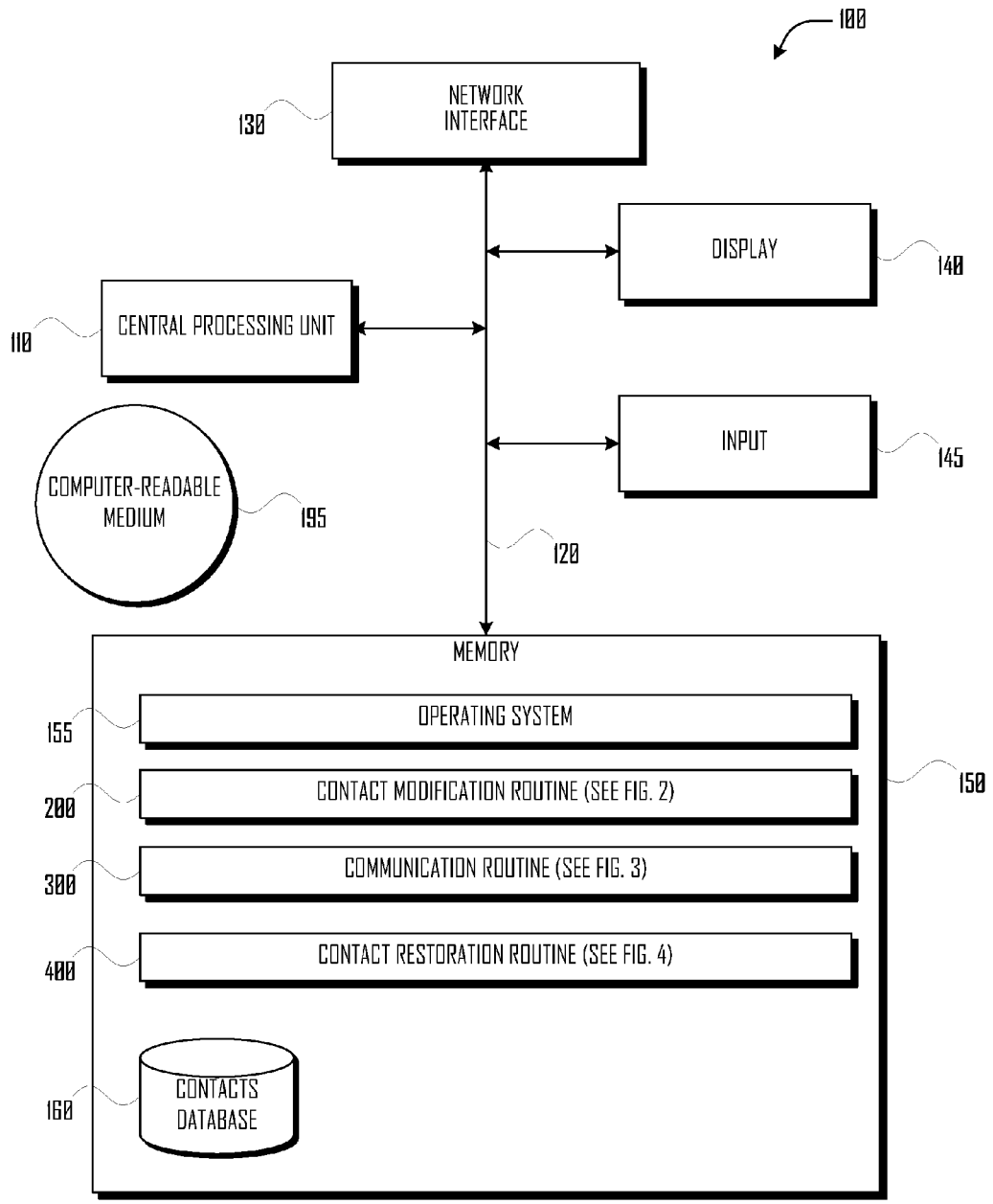
FIG. 1 illustrates several components of an exemplary mobile personal-computing device in accordance with one embodiment.

In various embodiments as described herein, a mobile personal-computing device may categorize a selected contact by collecting from the user information related to the selected contact's behavior and/or personality style. After obtaining communication hints for effectively communicating with similarly categorized individuals. The mobile personal-computing device modifies a remote or local contacts database such that when the user communicates with the selected contact, the mobile personal-computing device will automatically provide the communication hints to the user.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates several components of an exemplary mobile personal-computing device in accordance with one embodiment. In some embodiments, mobile personal-computing device 100 may include many more components than those shown in FIG. 1. However, it is not necessary that all of these generally conventional components be shown in order to disclose an illustrative embodiment.

Mobile personal-computing device 100 includes a bus 120 interconnecting components including a processing unit 110; a memory 150; input hardware 145 such as a keyboard, mouse, touchscreen, or the like; output hardware such as display 140; and network interface 130. The memory 150 generally comprises a random access memory ("RAM"), a read only memory ("ROM"), and a permanent mass storage device, such as a disk drive. The memory 150 stores program code for a routine 200 for modifying a selected contact record in a contacts database (see FIG. 2, discussed below); a routine 300 for presenting communication hints while a real-time, interactive communication session is pending or in progress (see FIG. 3, discussed below); and a routine 400 for restoring a modified contact record to an original state (see FIG. 4, discussed below). In addition, the memory 150 also stores an operating system 155 and contacts database 160.

These and other software components may be loaded into memory 150 of mobile personal-computing device 100 using a drive mechanism (not shown) associated with a non-transient computer readable storage medium 195, such as a floppy disc, tape, DVD/CD-ROM drive, memory card, or the like. In some embodiments, software components may alternately be loaded via the network interface 130, rather than via a non-transient computer readable storage medium 195.

Figure 2:
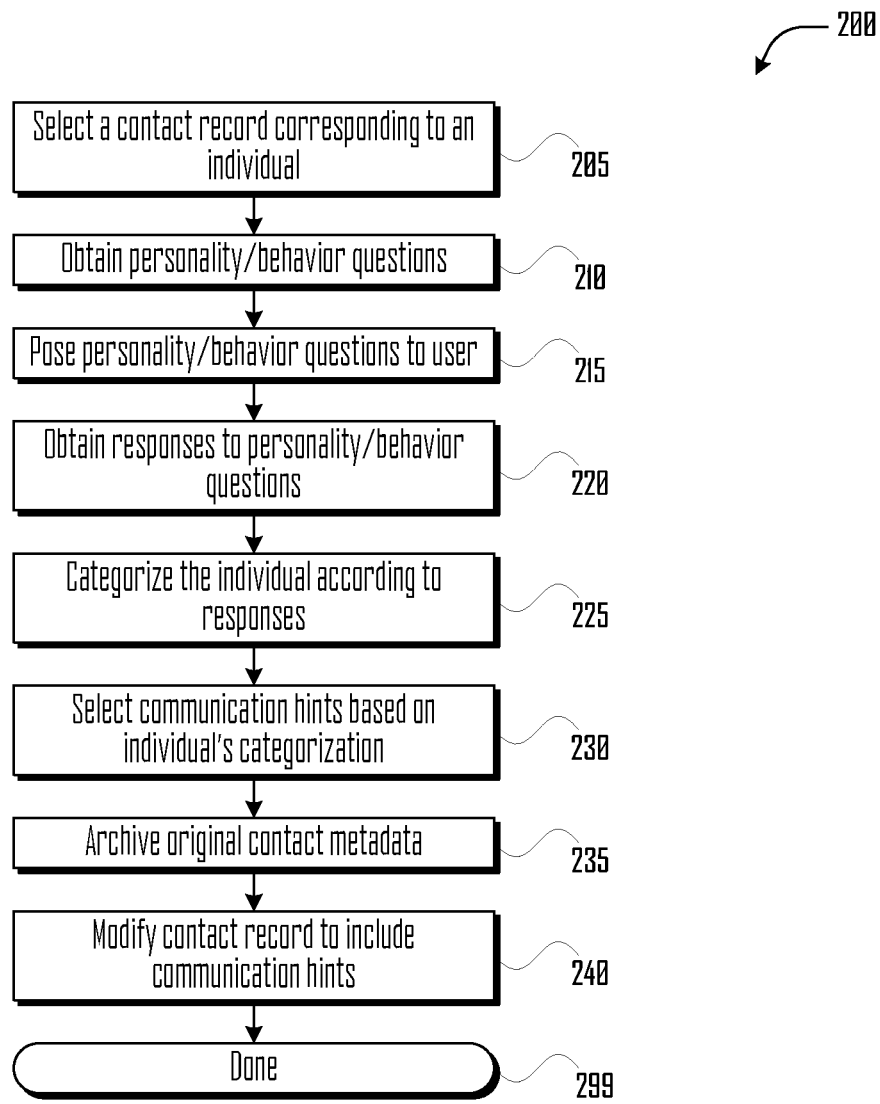
FIG. 2 illustrates a routine for modifying a selected contact record in a contacts database, such as may be performed by a mobile personal-computing device in accordance with one embodiment.

FIG. 2 illustrates a routine 200 for modifying a selected contact record in a contacts database, such as may be performed by a mobile personal-computing device 100 in accordance with one embodiment.

In block 205, routine 200 selects, from among a plurality of contact records stored in a contacts database (e.g., contacts database 160 or a remotely stored contacts database), a contact record corresponding to an individual who communicates from time to time with a user of the mobile personal-computing device 100. For example, in one embodiment, routine 200 may obtain a record including data and metadata similar to some or all of the following:

```
{
    "fn": "Simon Perreault",
    "n": {
        "surname": "Simon",
        "given": "Perreault",
        "suffix": [ "ing. jr", "M.Sc."]
    },
    "gender": { "sex": "M" },
    "org": {
        "type": "work",
        "text": "Viagenie"
    },
    "tel": [ {
        "type": ["work", "voice"],
        "uri": "tel:+1-418-656-9254;ext=102"
    },
    ],
    "email": {
        "type": "work",
        "text": "simon.perreault@viagenie.ca"
    },
    "tz": "America/Montreal",
    "imageURI": "file://Perreault.jpg"
}
```

In block 210, routine 200 obtains a plurality of questions that solicit information related to an individual's behavior and/or personality style. For example in some embodiments, routine 200 may obtain a plurality of alternative statement pairs, such as process/expedience alternative statement pairs 605*a-b* (see FIG. 6, discussed below) and/or controlled/responsive alternative statement pairs 610*a-b* (see FIG. 6, discussed below).

Using such alternative statement pairs, routine 200 may derive a plurality of questions that solicit information related to an individual's behavior and/or personality style by asking the user to select which statement of an alternative statement pair better describes an individual.

In block 215, routine 200 explicitly or implicitly poses the plurality of questions that solicit information related to an individual's behavior and/or personality style obtained in block 210 to the user via output hardware of the mobile personal-computing device 100, such as display 140 (see FIG. 1, discussed above).

In some embodiments, such questions may be presented explicitly as questions, such as question 505 (see FIG. 5, discussed below). In other embodiments, such questions may be presented as an instruction for the user to select a statement from an alternative statement pair, with the implicit understanding that the user should select the statement that better describes the individual in question.

In block 220, routine 200 obtains, e.g. via input hardware 145, a plurality of answers responsive to the plurality of questions that solicit information related to an individual's behavior and/or personality style posed in block 215. For example, in one embodiment, the user may tap a user-interface control, such as statement control 510*a* (see FIG. 5, discussed below), corresponding to a statement of an alternative statement pair to select that statement as more closely describing the individual than the unselected statement.

In block 225, routine 200 categorizes the individual into a determined one of a plurality of predetermined behavior and/or personality style categories, the categorization being based at least in part on the plurality of answers obtained in block 220. For example, in one embodiment, when the user provides input by selecting several more appropriate statements from several alternative statement pairs, routine 200 may position the individual in question within a behavior and/or personality style space. For example, as shown in two-dimensional behavior and/or personality style space 700 (see FIG. 7, discussed below), question responses that describe an individual along a process/expedience axis 705*a* and a controlled/responsive axis 705*b* may be used to categorize the individual into a quadrant corresponding to a behavior and/or personality style.

In the example illustrated as two-dimensional behavior and/or personality style space 700 (see FIG. 7, discussed below), individuals who are described by 'Controlled' statements more than 'Responsive' statements, and by 'Process' statements more than 'Expedience' statements, may be categorized in the 'Analyzer' quadrant or category. Similarly, individuals who are described by 'Controlled' statements more than 'Responsive' statements, and by 'Expedience' statements more than 'Process' statements, may be categorized in the 'Controller' quadrant or category; individuals who are described by 'Responsive' statements more than 'Controlled' statements, and by 'Process' statements more than 'Expedience' statements, may be categorized in the 'Stabilizer' quadrant or category; and individuals who are described by 'Responsive' statements more than 'Controlled' statements, and by 'Expedience' statements more than 'Process' statements, may be categorized in the 'Persuader' quadrant or category.

In block 230, routine 200 selects a plurality of communication hints based on the categorization determined in block 225. The communication hints are selected to promote effective communication between the user and the individual categorized in block 225. See, e.g., communication hints 805 (see FIG. 8, discussed below); communication hints 905 (see FIG. 9, discussed below); communication hints 1005 (see FIG. 10, discussed below); and communication hints 1105 (see FIG. 11, discussed below).

In block 235, routine 200 archives to a persistent memory some or all of the contact metadata obtained in block 205, such that the contact record may subsequently be restored to its current state. For example, in one embodiment, routine 200 may archive metadata such as an image and/or an image identifier associated with the contact record. See, e.g., routine 400 (see FIG. 4, discussed below).

In block 240, routine 200 modifies the contact record selected in block 205, such that during subsequent communication sessions between the user and the individual whose contact record is modified, the communication hints selected in block 230 will be automatically presented to the user. See, e.g., routine 300 (see FIG. 3, discussed below).

For example, in one embodiment, routine 200 may modify the contact record such that the modified contact record becomes associated with an image depicting the communication hints selected in block 230. In such an embodiment, the modified contact record may include data and metadata similar to some or all of the following:

```
{
    "fn": "Simon Perreault",
    "n": {
        "surname": "Simon",
        "given": "Perreault",
        "suffix": [ "ing. jr", "M.Sc."]
    },
    "gender": { "sex": "M" },
    "org": {
        "type": "work",
        "text": "Viagenie"
    },
    "tel": [ {
        "type": ["work", "voice"],
        "uri": "tel:+1-418-656-9254;ext=102"
    },
    ],
    "email": {
        "type": "work",
        "text": "simon.perreault@viagenie.ca"
    },
    "tz": "America/Montreal",
    "imageURI": "file://Persuader_Hints.jpg"
}
```

In other embodiments, routine 200 may modify the contact record in other ways, such as by including the communication hints in a general-purpose "notes" field or in a special-purpose "communication-hints" field.

Routine 200 ends in ending block 299.

Figure 3:
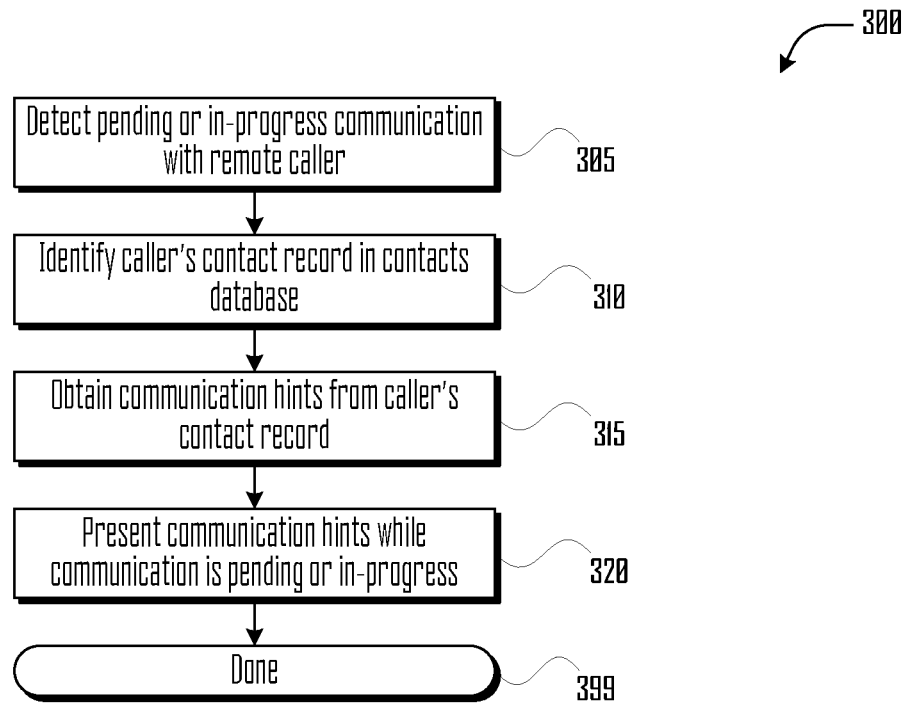
FIG. 3 illustrates a routine for presenting communication hints while a real-time, interactive communication session is pending or in progress, such as may be performed by a mobile personal-computing device in accordance with one embodiment.

FIG. 3 illustrates a routine 300 for presenting communication hints while a real-time, interactive communication session is pending or in progress, such as may be performed by a mobile personal-computing device 100 in accordance with one embodiment.

In block 305, routine 300 detects a pending or in progress real-time, interactive communication session between a user of mobile personal-computing device 100 and an identified remote caller. For example, in one embodiment, routine 300 may detect that a remote caller has placed a telephone call to the mobile personal-computing device 100. In such an embodiment, the remote caller may be identified via a caller identification or Caller ID service.

In block 310, routine 300 identifies a contact record in a contacts database (e.g., contacts database 160 or a remotely stored contacts database) (see FIG. 1, discussed above), using caller-identification data obtained in block 305.

In block 315, routine 300 obtains a plurality of communication hints from the contact record identified in block 310. In block 320, routine 300 presents the plurality of communication hints obtained in block 315. For example, in one embodiment, the plurality of communication hints may be obtained via digital image data that, when displayed on output hardware (e.g., display 140), depict the communication hints. See, e.g., communication hints 805 (see FIG. 8, discussed below); communication hints 905 (see FIG. 9, discussed below); communication hints 1005 (see FIG. 10, discussed below); and communication hints 1105 (see FIG. 11, discussed below).

When communication hints are encoded in digital image data in such a manner, routine 300 may be performed by standard, operating-system-provided incoming-call software, which may automatically obtain and display an image associated with a caller when a suitable image is identified in the caller's contact record. In other embodiments, the plurality of communication hints may be obtained via text data or other non-digital-image data, in which case a special-purpose handler may be employed to format and/or display the communication hints while the real-time, interactive communication session is pending or in progress.

Routine 300 ends in ending block 399.

Figure 4:
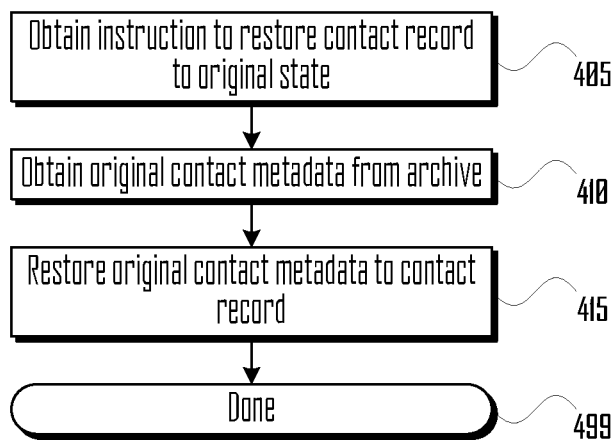
FIG. 4 illustrates a routine for restoring a modified contact record to an original state, such as may be performed by a mobile personal-computing device in accordance with one embodiment.

FIG. 4 illustrates a routine 400 for restoring a modified contact record to an original state, such as may be performed by a mobile personal-computing device 100 in accordance with one embodiment.

In block 405, routine 400 obtains an instruction (typically from a user) to restore an indicated contact record to a pre-modification state. In block 410, routine 400 obtains, from a persistent memory, an archived copy of a contact record or metadata therefrom, the copy having been archived before a modification was made to the contact record.

In block 415, routine 400 restores the contact record to a pre-modification state using the archived data obtained in block 410. Routine 400 ends in ending block 499.

Figure 5:
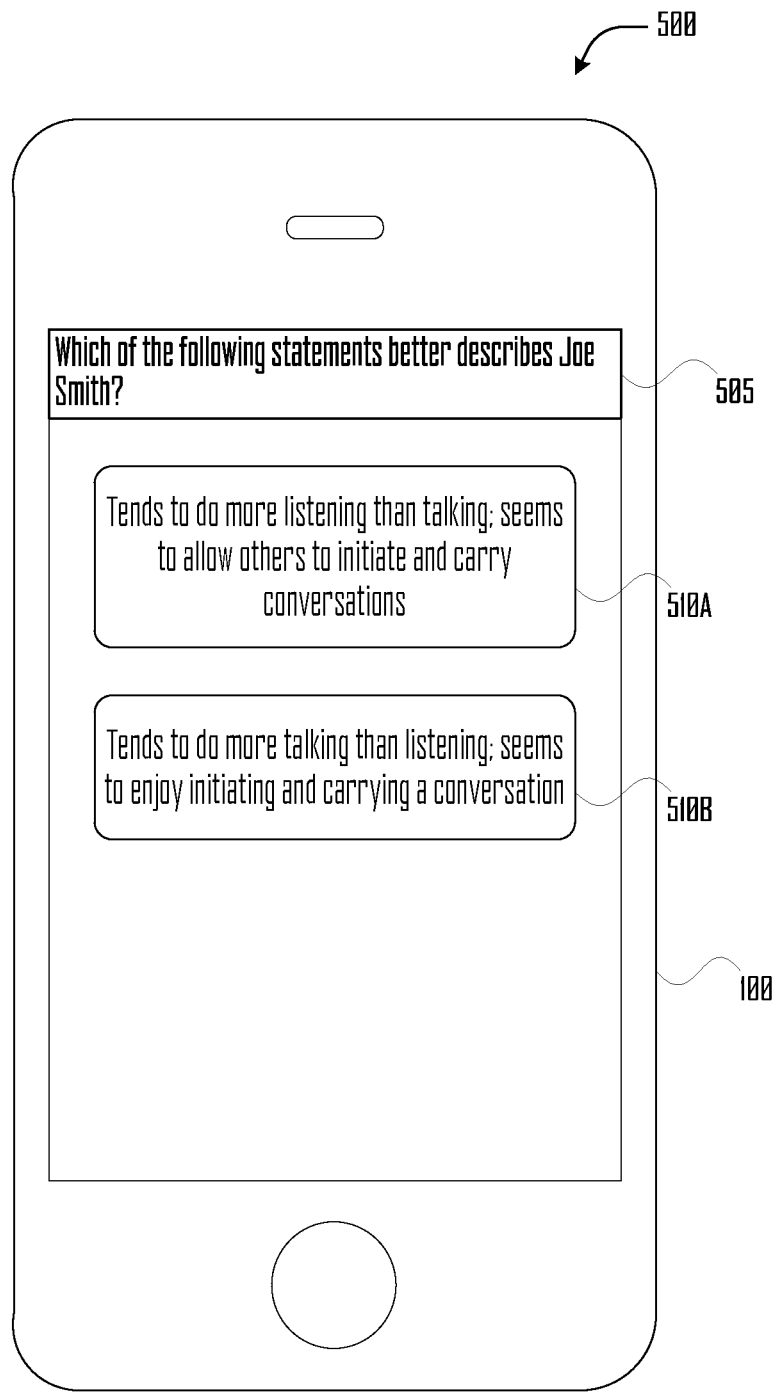
FIG. 5 illustrates a user-interface on a mobile personal-computing device posing a question via its display.

FIG. 5 illustrates a user-interface on a mobile personal-computing device 100 posing a question via its display. Question 505 poses an explicit question asking the user to select which statement better describes an indicated individual by activating either statement control 510a or statement control 510b. In the illustrated example, statement control 510a and statement control 510b correspond to alternative or opposing directions along a behavior and/or personality style axis, such as process/expedience axis 705a (see FIG. 7, discussed below).

In many embodiments, a series of several such alternative statement pairs may be presented to the user, and the responses given by the user may collectively describe a behavior and/or personality style of given individual.

FIG. 6 illustrates a plurality of alternative statement pairs that may be combined to form a plurality of questions that solicit information related to an individual's behavior and/or personality style.

Process/expedience alternative statement pairs 605a-b illustrate one exemplary set of alternative statement pairs, each of which correspond to alternative or opposing directions along a behavior and/or personality style axis, such as process/expedience axis 705a (see FIG. 7, discussed below).

Similarly, controlled/responsive alternative statement pairs 610a-b illustrate one exemplary set of alternative statement pairs, each of which correspond to alternative or opposing directions along a behavior and/or personality style axis, such as controlled/responsive axis 705b (see FIG. 7, discussed below).

Figure 7:
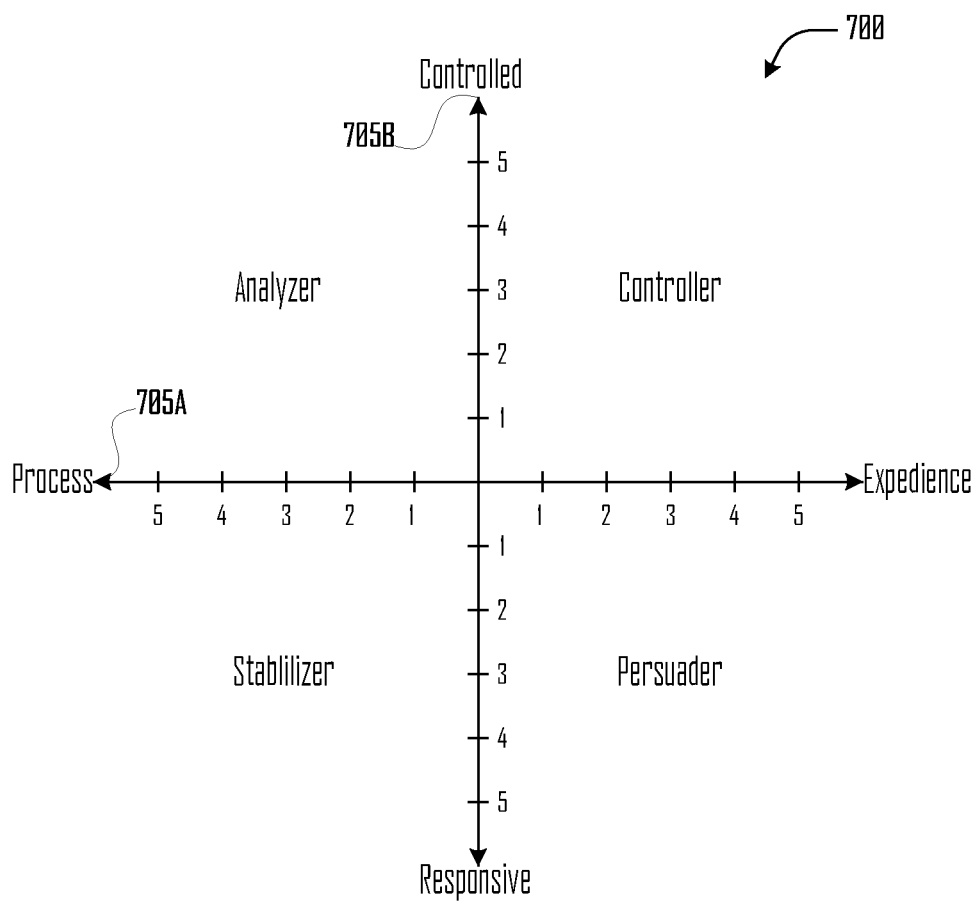
FIG. 7 illustrates a two-dimensional behavior and/or personality style space having four quadrants divided by a process/expedience axis and a controlled/responsive axis.

FIG. 7 illustrates a two-dimensional behavior and/or personality style space 700 having four quadrants divided by a process/expedience axis 705a and a controlled/responsive axis 705b.

Figure 8:
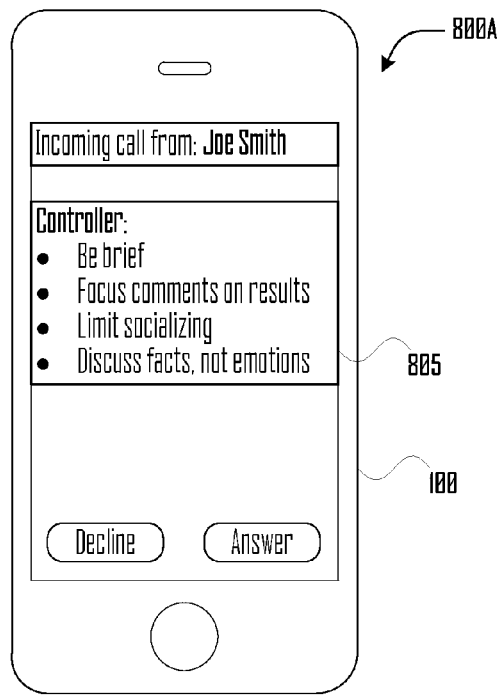
FIG. 8 illustrates a user-interface on a mobile personal-computing device providing communication hints for individuals having a 'Controller' behavior and/or personality style.

FIG. 8 illustrates a user-interface on a mobile personal-computing device 100 providing communication hints for individuals having a 'Controller' behavior and/or personality style. Communication hints 805 promote effective communications with individuals categorized as having a 'Controller' behavior and/or personality style.

Figure 9:
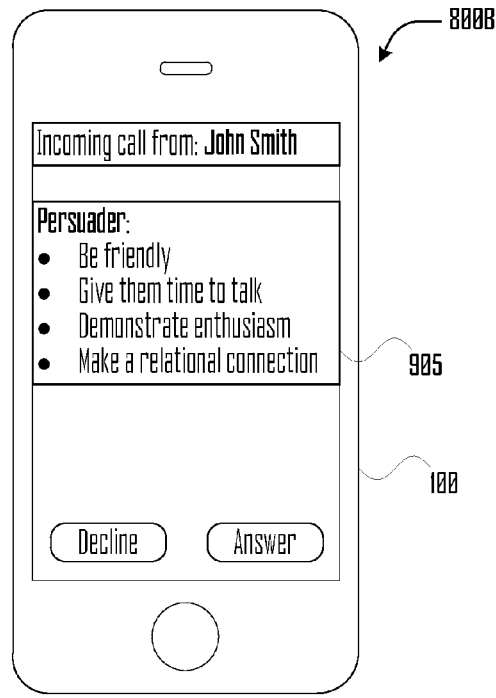
FIG. 9 illustrates a user-interface on a mobile personal-computing device providing communication hints for individuals having a 'Persuader' behavior and/or personality style.

FIG. 9 illustrates a user-interface on a mobile personal-computing device 100 providing communication hints for individuals having a 'Persuader' behavior and/or personality style. Communication hints 905 promote effective communications with individuals categorized as having a 'Persuader' behavior and/or personality style.

Figure 10:
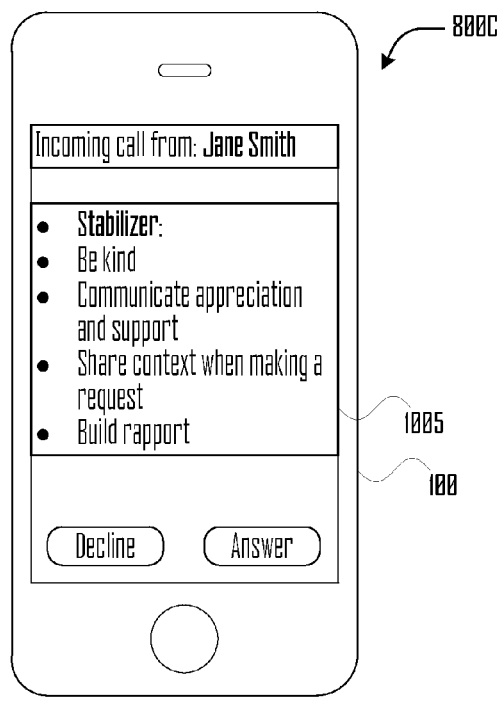
FIG. 10 illustrates a user-interface on a mobile personal-computing device providing communication hints for individuals having a 'Stabilizer' behavior and/or personality style.

FIG. 10 illustrates a user-interface on a mobile personal-computing device 100 providing communication hints for individuals having a 'Stabilizer' behavior and/or personality style. Communication hints 1005 promote effective communications with individuals categorized as having a 'Stabilizer' behavior and/or personality style.

Figure 11:
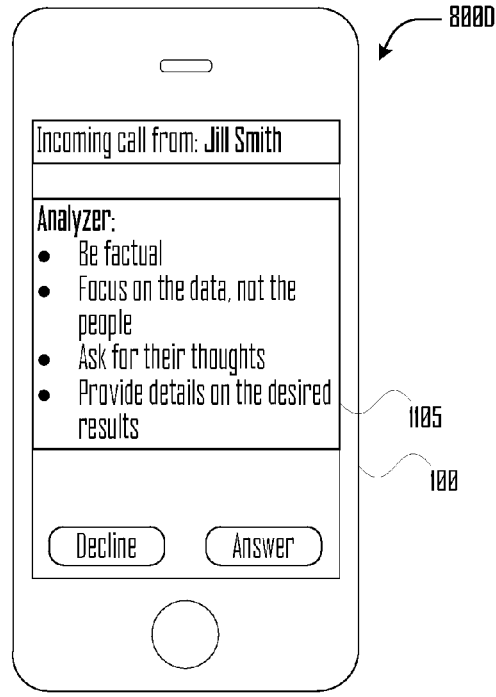
FIG. 11 illustrates a user-interface on a mobile personal-computing device providing communication hints for individuals having a 'Analyzer' behavior and/or personality style.

FIG. 11 illustrates a user-interface on a mobile personal-computing device 100 providing communication hints for individuals having a 'Analyzer' behavior and/or personality style. Communication hints 1105 promote effective communications with individuals categorized as having a 'Analyzer' behavior and/or personality style.

Although specific embodiments have been illustrated and described herein, it will be appreciated by those of ordinary skill in the art that alternate and/or equivalent implementations may be substituted for the specific embodiments shown and described without departing from the scope of the present disclosure. For example, other embodiments may employ other behavior and/or personality style assessments, such as the Myers-Briggs Type Indicator, the DISC assessment, and the like. Similarly, although exemplary embodiments are described above in reference to telephone calls, similar methods may be employed in connection with other types of real-time, interactive communication sessions, such as live video communications sessions, and the like. This application is intended to cover any adaptations or variations of the embodiments discussed herein.

The invention claimed is:

1. A mobile-personal-computer-implemented method for promoting effective communication, the method comprising:
    selecting, from among a plurality of contact records stored in a contacts database, a contact record corresponding to an individual who communicates from time to time with a user of a mobile personal computer;
    obtaining, by the mobile personal computer, a plurality of questions that solicit information related to said individual's personality and/or behavior style;
    posing, via output hardware associated with the mobile personal computer, said plurality of questions to said user of the mobile personal computer in regard to said selected contact record;
    obtaining, via input hardware associated with the mobile personal computer, user-input indicating a plurality of answers that correspond respectively to said plurality of questions;
    categorizing, by the mobile personal computer based at least in part on said plurality of answers, said individual into a determined one of a plurality of predetermined personality and/or behavior style categories;
    obtaining, by the mobile personal computer based at least in part on said determined personality and/or behavior style category, a plurality of communication hints for effectively communicating with individuals of said determined personality and/or behavior style category; and
    modifying, by the mobile personal computer, said selected contact record in said contacts database to include said plurality of communication hints, such that when the mobile personal computer subsequently detects that a real-time, interactive communication session between said user and said individual is pending or in progress, the mobile personal computer will automatically obtain said plurality of communication hints from said contacts database and present said plurality of communication hints to said user via said output hardware to promote effective communication between said user and said individual.

2. The method of claim 1, wherein modifying said selected contact record comprises:
    obtaining digital image data that when rendered depicts said plurality of communication hints; and
    associating said digital image data with said selected contact record in said contacts database.

3. The method of claim 2, further comprising:
    detecting that said real-time, interactive communication session is pending or in progress;
    retrieving said digital image data from said contacts database; and
    displaying said digital image data on said output hardware while said real-time, interactive communication session remains pending or in progress.

4. The method of claim 1, further comprising, prior to modifying said selected contact record:
    identifying original digital image data that is associated with said selected contact record; and
    archiving said original digital image data to a persistent memory.

5. The method of claim 4, further comprising:
    obtaining a user-provided instruction to restore said selected contact record to a pre-modification state;
    obtaining said original digital image data from said persistent memory; and
    reverting said selected contact record to include said original digital image data, thereby restoring said selected contact record to said pre-modification state.

6. The method of claim 1, wherein selecting said selected contact record comprises obtaining, via said input hardware, user-input indicating said selected contact record from among said plurality of contact records.

7. The method of claim 1, wherein said contacts database comprises a local contacts database.

8. The method of claim 1, wherein said plurality of predetermined personality and/or behavior style categories include at least two personality and/or behavior style categories selected from a group consisting of a 'Controller' category, a 'Stabilizer' category, an 'Analyzer' category, and a 'Persuader' category.

9. The method of claim 8, wherein:
    said determined personality and/or behavior style category comprises said 'Controller' category;
    said plurality of communication hints include at least two communication hints selected from a group consisting of the following:
        a communication hint that said user should be brief when communicating with said individual;
        a communication hint that said user should focus comments on results when communicating with said individual;
        a communication hint that said user should limit socializing when communicating with said individual; and
        a communication hint that said user should discuss facts, not emotions, when communicating with said individual.

10. The method of claim 8, wherein:
    said determined personality and/or behavior style category comprises said 'Persuader' category;
    said plurality of communication hints include at least two communication hints selected from a group consisting of the following:
        a communication hint that said user should be friendly when communicating with said individual;
        a communication hint that said user should give said individual time to talk when communicating with said individual;

a communication hint that said user should demonstrate enthusiasm when communicating with said individual; and a communication hint that said user should make a relational connection when communicating with said individual.

11. The method of claim 8, wherein:

said determined personality and/or behavior style category comprises said 'Stabilizer' category;

said plurality of communication hints include at least two communication hints selected from a group consisting of the following:

a communication hint that said user should be kind when communicating with said individual;

a communication hint that said user should communicate appreciation and support when communicating with said individual;

a communication hint that said user should share context when making a request when communicating with said individual; and a communication hint that said user should build rapport when communicating with said individual.

12. The method of claim 8, wherein:

said determined personality and/or behavior style category comprises said 'Analyzer' category;

said plurality of communication hints include at least two communication hints selected from a group consisting of the following:

a communication hint that said user should be factual when communicating with said individual;

a communication hint that said user should focus on data, not people, when communicating with said individual;

a communication hint that said user should ask for said individual's thoughts when communicating with said individual; and a communication hint that said user should provide details on desired results when communicating with said individual.

13. A computing apparatus comprising a processor and a memory having stored therein instructions that when executed by the processor, configure the apparatus to perform a method for promoting effective communication, the method comprising:

selecting, from among a plurality of contact records stored in a contacts database, a contact record corresponding to an individual who communicates from time to time with a user of the computing apparatus;

obtaining a plurality of questions that solicit information related to said individual's personality and/or behavior style;

posing, via output hardware associated with the computing apparatus, said plurality of questions to said user of the computing apparatus in regard to said selected contact record;

obtaining, via input hardware associated with the computing apparatus, user-input indicating a plurality of answers that correspond respectively to said plurality of questions;

categorizing, based at least in part on said plurality of answers, said individual into a determined one of a plurality of predetermined personality and/or behavior style categories;

obtaining, based at least in part on said determined personality and/or behavior style category, a plurality of communication hints for effectively communicating with individuals of said determined personality and/or behavior style category; and modifying said selected contact record in said contacts database to include said plurality of communication hints, such that when the computing apparatus subsequently detects that a real-time, interactive communication session between said user and said individual is pending or in progress, the computing apparatus will automatically obtain said plurality of communication hints from said contacts database and present said plurality of communication hints to said user via said output hardware to promote effective communication between said user and said individual.

14. The apparatus of claim 13, wherein modifying said selected contact record comprises:

obtaining digital image data that when rendered depicts said plurality of communication hints; and associating said digital image data with said selected contact record in said contacts database.

15. The apparatus of claim 14, the method further comprising:

detecting that said real-time, interactive communication session is pending or in progress;

retrieving said digital image data from said contacts database; and displaying said digital image data on said output hardware while said real-time, interactive communication session remains pending or in progress.

16. The apparatus of claim 13, further comprising, prior to modifying said selected contact record:

identifying original digital image data that is associated with said selected contact record; and archiving said original digital image data to a persistent memory.

17. A non-transient computer-readable storage medium having stored therein instructions that when executed by a processor, configure the processor to perform a method for promoting effective communication, the method comprising:

selecting, from among a plurality of contact records stored in a contacts database, a contact record corresponding to an individual who communicates from time to time with a user of the processor;

obtaining a plurality of questions that solicit information related to said individual's personality and/or behavior style;

posing, via output hardware associated with the processor, said plurality of questions to said user of the processor in regard to said selected contact record;

obtaining, via input hardware associated with the processor, user-input indicating a plurality of answers that correspond respectively to said plurality of questions;

categorizing, based at least in part on said plurality of answers, said individual into a determined one of a plurality of predetermined personality and/or behavior style categories;

obtaining, based at least in part on said determined personality and/or behavior style category, a plurality of communication hints for effectively communicating with individuals of said determined personality and/or behavior style category; and modifying said selected contact record in said contacts database to include said plurality of communication hints, such that when the processor subsequently detects that a real-time, interactive communication session between said user and said individual is pending or in progress, the processor will automatically obtain said plurality of communication hints from said contacts database and present said plurality of communication hints to said user via said output hardware to promote effective communication between said user and said individual.

18. The storage medium of claim 17, wherein modifying said selected contact record comprises:
   obtaining digital image data that when rendered depicts said plurality of communication hints; and
   associating said digital image data with said selected contact record in said contacts database.

19. The storage medium of claim 18, the method further comprising:
   detecting that said real-time, interactive communication session is pending or in progress;
   retrieving said digital image data from said contacts database; and
   displaying said digital image data on said output hardware while said real-time, interactive communication session remains pending or in progress.

20. The storage medium of claim 17, further comprising, prior to modifying said selected contact record:
   identifying original digital image data that is associated with said selected contact record; and
   archiving said original digital image data to a persistent memory.

* * * * *